(12) United States Patent
Mantovani

(10) Patent No.: US 7,044,478 B2
(45) Date of Patent: May 16, 2006

(54) COAXIAL MOUNTING SEAT FOR THE SHANK OF A TOOLHOLDER

(76) Inventor: Sascha Mantovani, Via Camara 46, Breganzona 6932 (CH)

( * ) Notice: Subject to any disclaimer, the term of this patent is extended or adjusted under 35 U.S.C. 154(b) by 0 days.

(21) Appl. No.: 10/498,118

(22) PCT Filed: Dec. 10, 2001

(86) PCT No.: PCT/IB01/02381

§ 371 (c)(1),
(2), (4) Date: Jun. 9, 2004

(87) PCT Pub. No.: WO03/049890

PCT Pub. Date: Jun. 19, 2003

(65) Prior Publication Data

US 2005/0017461 A1    Jan. 27, 2005

(51) Int. Cl.
*B23B 31/06* (2006.01)
(52) U.S. Cl. .................. 279/8; 279/157; 409/231
(58) Field of Classification Search ............ 279/8, 279/9.1, 16, 125, 157; 409/231, 234
See application file for complete search history.

(56) References Cited

U.S. PATENT DOCUMENTS 3,521,896 A * 7/1970 Masakazu ............... 279/91
3,774,928 A * 11/1973 Hanak et al. ............ 279/22
5,158,408 A * 10/1992 Naito ...................... 409/234
5,322,304 A * 6/1994 Rivin ...................... 279/103
5,622,373 A * 4/1997 Tagami .................... 279/52
5,788,249 A * 8/1998 Tagami .................... 279/51
5,997,226 A * 12/1999 Tagami .................... 409/231
6,779,955 B1 * 8/2004 Rivin ...................... 409/234

OTHER PUBLICATIONS

Patent Abstracts of Japan vol. 007, No. 092 (M-298), Apr. 16, 1983 & JP 058 015639 A (Seiwa Seimitsu Kouki), Jan. 29, 1983 abstract.

* cited by examiner

Primary Examiner—Boyer D. Ashley
Assistant Examiner—Ali Abdelwahed
(74) Attorney, Agent, or Firm—Young & Thompson

(57) ABSTRACT

A mounting seat (1) for machine-tools allowing coaxial engagement of the shank (2c) of a toolholder member (2) includes internally a cylindrical bush (3) supporting a plurality of ball bearings (4i) arranged without play between the internal surface (1i) of the mounting seat (1) and the external surface (2e) of the shank (2c). The bush (3) is able to perform an axial sliding movement (S) towards the outside of the mounting seat (1) over a length smaller than or equal to the axial length of its zone occupied by the ball bearings (4i), further axial travel thereof being prevented by end-of-travel stop elements (3s, 1r) and the abovementioned bush (3) having, mounted on it, elements able to prevent separation of the ball bearings (4n) when the zone thereof occupied by the latter is located outside of the mounting seat (1).

2 Claims, 2 Drawing Sheets

COAXIAL MOUNTING SEAT FOR THE SHANK OF A TOOLHOLDER

BACKGROUND OF THE INVENTION

The present invention relates to the sector of machine-tool components and more particularly to a machine-tool mounting seat suitable for engaging therein, coaxially with said seat, the shank of a machine-tool member (for example a collet).

DESCRIPTION OF THE RELATED ART

As persons skilled in the art know, the main requirement of a mounting seat of the type described above is that of allowing the perfectly coaxial engagement of the shank of the toolholder member so as to avoid lack of precision in machining caused by eccentricity or play.

Especially in the field of automated machine-tools which operate at high speed, a mounting seat must also allow a rapid engaging movement, usually by means of screwing of a threaded part of the shank therein.

The coupling system which offers the best degree of precision as regards the coaxial alignment between the two parts consists, as is known to persons skilled in the art, of a ball bushing arranged between the parts without play or with a slight interference between the ball bearings and the surfaces of the two parts on which they roll.

In the case of a toolholder member, this type of coupling, however, has proved impossible hitherto owing to the difficulty of inserting and removing the shank into/from a bush fixed inside a cavity of the mounting seat during the automatic operation of engagement of the toolholder member.

SUMMARY OF THE INVENTION

The inventor of the present invention has realized, however, that, if this bush were extractable coaxially, said engagement could be facilitated by the resilient yielding of the bush structure when the ball bearings are not pressed by the outside of the internal surface of the mounting seat.

Once the shank has been inserted, it would then be easier to insert the shank/bush assembly into the cavity of the seat since the bush itself may be guided by a part thereof which always remains inserted in a perfectly coaxial manner inside the cavity of the seat itself.

When the bush in question is extracted from its seat, there would be, however, the problem of separation of the ball bearings from said bush due to the effect of gravity; in order to overcome this problem, the inventor has envisaged constructing said bush by mounting thereon a cylindrical sheet-metal cage, coaxially on the outside thereof, having a plurality of holes designed to allow the ball bearings to project from them over a desired height without, however, being able to come out of said holes. With this arrangement, the ball bearings are retained internally by the bush and externally by said cage, and the bush/cage assembly may be extracted from the mounting seat without the ball bearings being able to become separated therefrom.

It is also necessary to limit axial sliding of the bush and, for this purpose, the inventor has envisaged providing end-of-travel stop means which prevent further axial travel of the bush after it has performed a sliding movement equal to about the axial length of the zone occupied by the above-mentioned ball bearings. With the aid of this set of measures, the inventor has provided a mounting seat for the shank of a toolholder member which is able to take advantage of the high degree of coupling precision made possible by the use of ball bushings.

The present invention in fact relates to a mounting seat for machine-tools allowing coaxial engagement of a cylindrical shank of a toolholder member as described below.

BRIEF DESCRIPTION OF THE DRAWINGS

A more detailed description of a preferred example of embodiment of the mounting seat according to the invention will now be described with reference also to the accompanying drawings in which.

DESCRIPTION OF THE PREFERRED EMBODIMENTS

Figure 1:
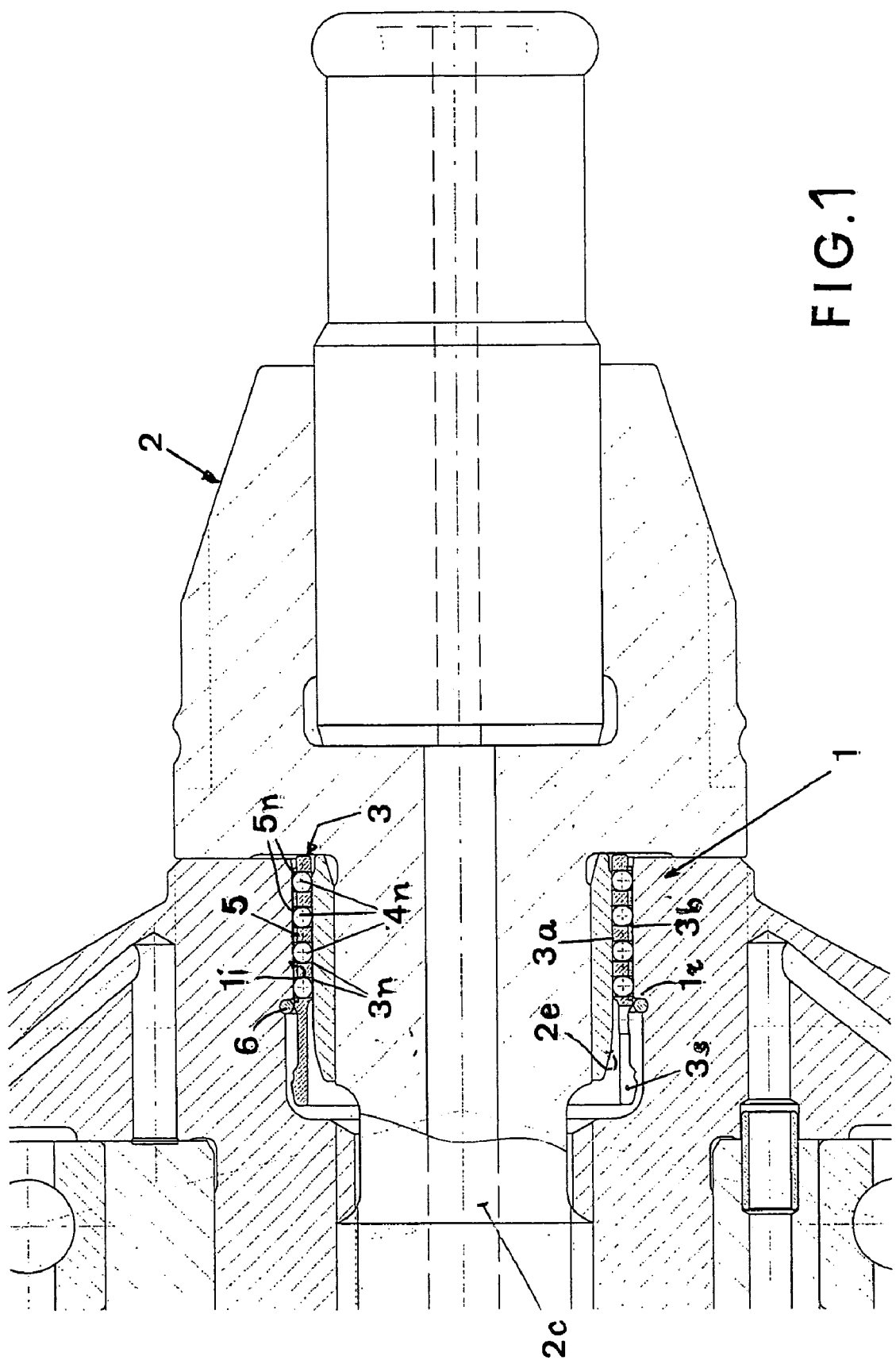
FIG. 1 shows a longitudinal section through said example of embodiment of a mounting seat according to the invention, with the bush totally inserted inside it when a toolholder collet is screwed into it in its working position.

If we consider FIG. 1, in said figure it can be seen how a ball bushing 3 is arranged in a mounting seat 1 according to the invention, between its cylindrical internal surface 1$i$ and the external surface 2$e$, also cylindrical, of the shank 2$c$ of a toolholder collet 2 which is coaxially screwed and engaged therein, said bushing being formed, in a known manner, by a ring having, formed in it, a plurality of cavities 3$n$ housing a corresponding number of ball bearings 4$n$ which are able to rotate freely therein and which project from both the sides 3$a$, 3$b$ of said bush 3.

These ball bearings are arranged between the external surface 2$e$ of the shank 2$c$ and the internal surface 1$i$ of the mounting seat 1 with a limited amount of interference, the order of magnitude of which is known to persons skilled in the art.

Figure 2:
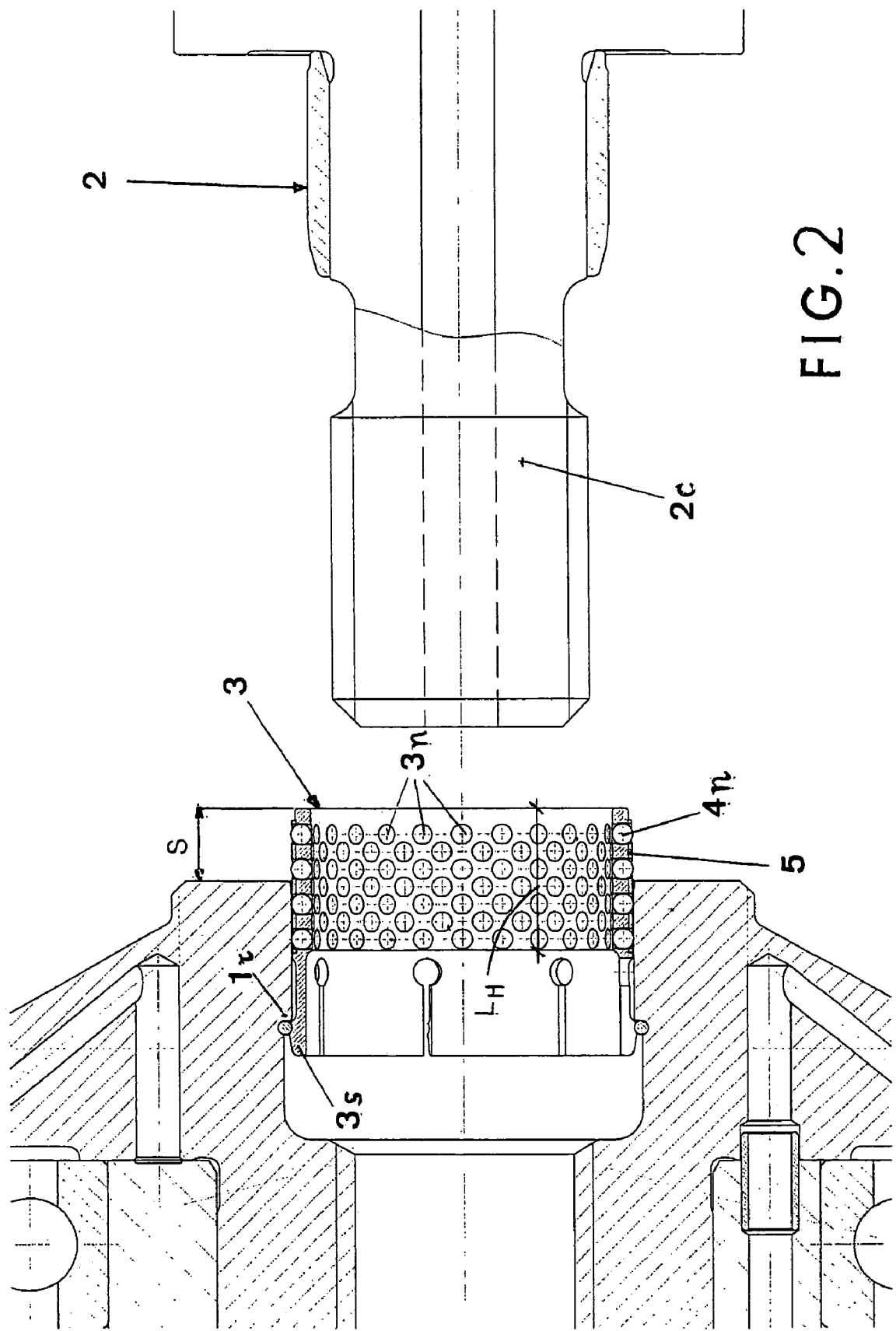
FIG. 2 shows a longitudinal section through the mounting seat according to FIG. 1, with the bush extracted axially therefrom.

The operating unit using the toolholder collet 2 performs its assigned machining operation in the situation shown in FIG. 1. At the end of machining, when it is required to remove said toolholder collet 2, it is sufficient to unscrew it in the usual manner so that it comes out of the mounting seat 1, drawing out the bush 3 axially from the latter, as can be seen in FIG. 2. While the toolholder collet 2 may be further extracted for removal thereof, the bush 3 may only perform an axial sliding movement S which is smaller than or equal to the axial length $L_H$ of its zone in which the ball bearings 4$n$ are housed, since, at the end of this sliding movement, a projecting part 3$s$ thereof presses against an end-of-travel contact shoulder 1$r$ formed on the internal surface 1$i$ of the mounting seat 1. Advantageously, a resilient ring 6 may be arranged between the two surfaces which make contact, in order to dampen the impacts. When the bush 3 is extracted over a length S, the ball bearings 4$n$, which would become separated from it as a result of gravity, are kept in their place by a cylindrical sheet-metal cage 5 having, formed in it, holes 5$n$ which allow the ball bearings 4$n$ to rotate and project externally through them, without however being able to come out of the holes.

This cylindrical cage 5 therefore performs two advantageous functions: that of keeping the ball bearings 4$n$ in position and that of allowing easier insertion and extraction of the shank 2$c$ of the bush 3 by means of limited resilient yielding thereof in the radial direction. All the pre-set objects of the inventor have thus been achieved.

In order to limit the axial sliding movement of the bush 3, means having a form and position different from those described hitherto and illustrated in the drawings may also be used.

Moreover, in order to retain the ball bearings 4n in position, means other than the cylindrical cage described above may also be used, provided that they perform a similar function.

The invention claimed is:

1. Mounting seat for machine-tools allowing coaxial engagement of a shank (2c) of a toolholder member (2), comprising internally a cylindrical bush (3) supporting a plurality of ball bearings (4i) arranged without play between an internal surface (1i) of the mounting seat (1) itself and an external surface (2e) of said shank (2c), said bush (3) being able to perform an axial sliding movement (S) towards the outside of the mounting seat (1) over a length smaller than or equal to an axial length ($L_H$) of its zone occupied by said ball bearings (4i), further axial travel thereof being prevented by an end-of-travel stop means (3s, 1r) and the abovementioned bush (3) having, mounted on it, means able to prevent separation of the ball bearings (4n) when said zone thereof occupied by the latter is located outside of the mounting seat (1), in which the abovementioned bush (3) has a plurality of cavities (3n) able to house inside them a corresponding number of ball bearings (4n) projecting from both sides (3a, 3b) of the bush (3) itself, the latter having, mounted on it, coaxially on the outside thereof, a cylindrical sheet-metal (5) cage which has, formed in it, a plurality of holes (5n) able to allow said ball bearings (4i) to rotate and project externally through them without being able to come out of said holes.

2. Mounting seat for machine-tools allowing coaxial engagement of a shank (2c) of a toolholder member (2), comprising internally a cylindrical bush (3) supporting a plurality of ball bearings (4i) arranged without play between an internal surface (1i) of the mounting seat (1) itself and an external surface (2e) of said shank (2c), said bush (3) being able to perform an axial sliding movement (S) towards the outside of the mounting seat (1) over a length smaller than or equal to an axial length ($L_H$) of its zone occupied by said ball bearings (4i), further axial travel thereof being prevented by an end of-travel stop means (3s, 1r) and the abovementioned bush (3) having, mounted on it, means able to prevent separation of the ball bearings (4n) when said zone thereof occupied by the latter is located outside of the mounting seat (1), in which said end-of travel stop means comprises a projecting part (3s) of the bush (3) which, at the end of said axial sliding movement (S), presses against a shaped contact shoulder (1r) formed on said internal surface (1i) of the mounting seat (1) itself, and in which the abovementioned bush (3) has a plurality of cavities (3n) able to house inside them a corresponding number of ball bearings (4n) projecting from both sides (3a, 3b) of the bush (3) itself, the latter having, mounted on it, coaxially on the outside thereof, a cylindrical sheet-metal (5) cage which has, formed in it, a plurality of holes (5n) able to allow said ball bearings (4i) to rotate and project externally through them without being able to come out of said holes.

* * * * *